United States Patent
Yang et al.

(10) Patent No.: US 10,448,088 B2
(45) Date of Patent: Oct. 15, 2019

(54) APPARATUS AND METHOD FOR TRANSMITTING AND RECEIVING SIGNALING INFORMATION IN DIGITAL BROADCAST SYSTEM

(71) Applicants: Samsung Electronics Co., Ltd., Suwon-si, Gyeonggi-do (KR); KYONGGI UNIVERSITY INDUSTRY & ACADEMIA COOPERATION FOUNDATION, Suwon-si, Gyeonggi-do (KR)

(72) Inventors: Hyun-Koo Yang, Seoul (KR); Byoung-Dai Lee, Yongin-si (KR); Sung-Hee Hwang, Suwon-si (KR); Sung-Oh Hwang, Yongin-si (KR)

(73) Assignees: Samsung Electronics Co., Ltd., Suwon-si (KR); Kyonggi University Industry & Academia Cooperation Foundation, Suwon-si (KR)

( * ) Notice: Subject to any disclaimer, the term of this patent is extended or adjusted under 35 U.S.C. 154(b) by 88 days.

(21) Appl. No.: 15/110,682

(22) PCT Filed: Jan. 8, 2015

(86) PCT No.: PCT/KR2015/000174
§ 371 (c)(1),
(2) Date: Jul. 8, 2016

(87) PCT Pub. No.: WO2015/105342
PCT Pub. Date: Jul. 16, 2015

(65) Prior Publication Data
US 2016/0330510 A1    Nov. 10, 2016

(30) Foreign Application Priority Data

Jan. 8, 2014  (KR) .................. 10-2014-0002520

(51) Int. Cl.
*H04N 7/173*   (2011.01)
*H04N 21/434*  (2011.01)
(Continued)

(52) U.S. Cl.
CPC ..... *H04N 21/4345* (2013.01); *H04N 21/4381* (2013.01); *H04N 21/4383* (2013.01);
(Continued)

(58) Field of Classification Search
CPC ........... H04N 21/4345; H04N 21/6112; H04N 21/4383; H04N 21/4381; H04N 21/44
(Continued)

(56) References Cited

U.S. PATENT DOCUMENTS

2003/0103571 A1* 6/2003 Meehan ......... H04N 21/234327
                                                375/240.27
2008/0216133 A1* 9/2008 Vergoossen ...... H04N 21/23109
                                                725/86
(Continued)

FOREIGN PATENT DOCUMENTS

CN    101843063 A    9/2010
CN    101933260 A    12/2010
(Continued)

OTHER PUBLICATIONS

"Information, n." OED Online, Oxford University Press, Jun. 2018, www.oed.com/view/Entry/95568. Accessed Aug. 2, 2018.*
(Continued)

*Primary Examiner* — Michael B. Pierorazio
(74) *Attorney, Agent, or Firm* — Jefferson IP Law, LLP

(57) ABSTRACT

A method for receiving signaling information in a digital broadcast system according to an embodiment of the present invention comprises: a step of receiving a plurality of frames in which signaling information of a second layer is inserted in a signaling area of a first layer or a packet of a first layer;
(Continued)

and a step of determining the signaling information of the second layer from the signaling area of the first layer or the packet of the first layer, and receiving service data using at least one of the determined signaling information of the second layer and pre-stored signaling information of a second layer.

6 Claims, 11 Drawing Sheets

(51) Int. Cl.
| | |
|---|---|
| *H04N 21/44* | (2011.01) |
| *H04N 21/438* | (2011.01) |
| *H04N 21/61* | (2011.01) |
| H04L 29/06 | (2006.01) |
| H04L 29/08 | (2006.01) |

(52) U.S. Cl.
 CPC ......... *H04N 21/44* (2013.01); *H04N 21/6112* (2013.01); *H04L 69/22* (2013.01); *H04L 69/323* (2013.01); *H04L 69/324* (2013.01)

(58) Field of Classification Search
 USPC ....................................................... 725/131
 See application file for complete search history.

(56) References Cited

U.S. PATENT DOCUMENTS

| | | | | |
|---|---|---|---|---|
| 2008/0225995 | A1* | 9/2008 | Auranen | ............. H04L 27/0012 |
| | | | | 375/344 |
| 2009/0190677 | A1* | 7/2009 | Jokela | ................... H04L 1/0071 |
| | | | | 375/260 |
| 2009/0203326 | A1 | 8/2009 | Vesma et al. | |
| 2009/0299966 | A1* | 12/2009 | Schneider | ........... G06F 16/2246 |
| 2010/0034219 | A1* | 2/2010 | Stadelmeier | ............ H04L 5/005 |
| | | | | 370/478 |
| 2010/0195633 | A1* | 8/2010 | Vare | ..................... H04W 36/385 |
| | | | | 370/338 |
| 2011/0013718 | A1* | 1/2011 | Ko | ........................ H04L 1/0045 |
| | | | | 375/295 |
| 2013/0279380 | A1* | 10/2013 | Hong | ..................... H04H 20/72 |
| | | | | 370/310 |
| 2014/0195879 | A1* | 7/2014 | Hong | ..................... H04H 20/42 |
| | | | | 714/776 |

FOREIGN PATENT DOCUMENTS

| | | |
|---|---|---|
| CN | 101971533 A | 2/2011 |
| CN | 103325914 A | 9/2013 |
| EP | 2458771 A1 | 5/2012 |
| KR | 10-2009-0031328 A | 3/2009 |
| KR | 10-2009-0085515 A | 8/2009 |
| KR | 10-2009-0126298 A | 12/2009 |
| KR | 10-2013-0127990 A | 11/2013 |

OTHER PUBLICATIONS

"Signal, v." OED Online, Oxford University Press, Jun. 2018, www.oed.com/view/Entry/179520. Accessed Aug. 2, 2018.*

* cited by examiner

| Syntax | No. of Bits |
|---|---|
| NUM_PLP<br>For (i=0;i<NUM_PLP;++i) {<br>  PLP_ID<br>  PLP_L2TUN_MODE<br>} | 8<br><br>8<br>2 |

FIG.5

| Syntax | No. of Bits | Format |
|---|---|---|
| L2_signaling_table_update_notification | | |
|   PLP_ID | 8 | uimsbf |
|   NUM_TABLES | 8 | uimsbf |
|   for (i=0;i<NUM_TABLES;++i) { | | |
|     TABLE_ID | 8 | uimsbf |
|     TABLE_ID_EXTENTION | 16 | uimsbf |
|     VERSION_NUMBER | 5 | uimsbf |
|     SIGNIFICANCE_FLAG | 3 | bslbf |
|   } | | |
| } | | |

FIG.6A

| Syntax | No. of Bits | Format |
|---|---|---|
| L2_signaling_table_update_notification { | | |
|   NUM_PLP | 8 | uimsbf |
|   for (i=0;i<NUM_PLP;++i) { | | |
|     PLP_ID | 8 | uimsbf |
|     NUM_TABLES | 8 | uimsbf |
|     for j=0..NUM_TABLES { | | |
|       TABLE_ID | 8 | uimsbf |
|       TABLE_ID_EXTENTION | 16 | uimsbf |
|       VERSION_NUMBER | 5 | uimsbf |
|       SIGNIFICANCE_FLAG | 3 | bslbf |
|     } | | |
|   } | | |
| } | | |

FIG.6B

| Syntax | No. of Bits |
|---|---|
| NUM_PLP | 8 |
| For (i=0;i<NUM_PLP;++i) { | |
|   PLP_ID | 8 |
|   if (PLP_L2TUN_MODE == '01') { | |
|     NUM_TABLES | 8 |
|     for (j=0;j<NUM_TABLES;++j) { | |
|       TABLE_ID | 8 |
|       TABLE_ID_EXTENSION | 16 |
|       VERSION_NUMBER | 5 |
|       SIGNIFICANCE_FLAG | 3 |
|     } | |
|   } | |
| } | |

APPARATUS AND METHOD FOR TRANSMITTING AND RECEIVING SIGNALING INFORMATION IN DIGITAL BROADCAST SYSTEM

PRIORITY

This application is a National Phase Entry of PCT International Application No. PCT/KR2015/000174, which was filed on Jan. 8, 2015, and claims a priority to Korean Patent Application No. 10-2014-0002520, which was filed on Jan. 8, 2014, the contents of which are incorporated herein by reference.

TECHNICAL FIELD

The present invention relates to apparatuses and methods for communicating a plurality of frames containing signaling information in digital broadcast systems.

BACKGROUND ART

As electronic technology develops, high-definition digital televisions, high-end smartphones, or other portable broadcast devices are spreading, and accordingly, the demand for various reception schemes for broadcast services and support of a diversity of services is increasing. In particular, there is increasing demand for supporting various services, such as high-quality contents, interactive services, and multi-screen services for ultra-high definition television (UHDT).

Meeting such demand requires parallel development of devices for playing contents and configuring and representing techniques for generating contents and transmission technology for transferring contents. Among them, transmission techniques may be classified into physical aspect and logical aspect.

A broadcast service consists of one or more video and audio streams and may include multiple data streams as necessary. The logical aspect of transmission technology includes techniques for configuring a multiplex including one or more broadcast services and meta data necessary for playing the broadcast services and transmitting the same through one logical channel. Representative examples of such meta data include service configuration information, such as the type of broadcast service included in the multiplex, the type of video, audio, and data streams constituting an individual broadcast service, and information necessary to extract from the multiplex the broadcast service and individual streams constituting the broadcast service, and EPG-related information such as broadcast start/end time or synopsis. According to the conventional art, the meta data is generally transmitted through the signaling information of the data link layer (i.e., layer 2 (L2)).

Generally, two procedures are required to play a broadcast service. That is, the receiving part playing broadcast service receives L2 signaling information transmitted through the L2 layer to obtain service configuration information necessary for playing individual broadcast services, and in case the user selects some broadcast service, receives the video, audio, and data streams from the transmission medium using the individual stream information constituting the broadcast service from the obtained service configuration information.

The L2 signaling information may be converted into a corresponding frequency and extracted in real-time whenever the user selects any broadcast service, or the L2 signaling information transmitted at each frequency through such an operation as channel scanning may be first obtained, cashed to the playing device, and used. The former case has a shortcoming in that the real-time processing increases the channel zapping time while the latter one may not play the broadcast service if the cached information is not consistent with the signaling information actually transmitted. Accordingly, in order to address the above problems, in case the signaling information is cached by the receiving part and used, comparison in version information is made between the stored information and the signaling information actually transmitted to identify whether they are consistent with each other, and if they are of the same version, the stored information may be then used as its to play the broadcast service. If they are inconsistent with each other, latest L2 signaling information may be obtained to update the existing stored information and the broadcast service is then played. However, the approach through simple comparison in version information has potential problems in light of shortening the channel zapping time. For example, L2 signaling information may break down into information directly associated with actually playing broadcast service and information not directly associated therewith. Accordingly, in case the information not directly associated with the play of broadcast service of the stored L2 signaling information is varied, since the broadcast service may be played using the stored existing information, no problem arises with playing the broadcast service even without updating the L2 signaling information in real-time.

As an example of the transmission technique in the physical aspect, such broadcast communication standard as digital video broadcasting the second generation terrestrial (DVB-T2) has been developed. DVB-T2 is a second generation European terrestrial digital broadcast standard as an evolution of DVB-T, which has been adopted thus far as standard by 35 countries or more worldwide including the European countries and is now in service. DVB-T2 employs the state-of-art techniques, such as low density parity check (LDPC) code and 256 quadrature amplitude modulation (256QAM) schemes to increase transmission capacity and implement higher bandwidth efficiency. Further, this standard has adopted a logical channel called physical layer pipe (PLP) for physical signal frames and may thus provide various high-quality services, e.g., HDTV, through the limited bandwidth.

Further, DVB-T2 includes a physical layer (i.e., layer 1 (L1) signaling area in each frame to process data and may more efficiently process data depending on the information contained in the L1 signaling area.

DISCLOSURE

Technical Problem

The present invention provides an apparatus and method for communicating signaling information in a digital broadcast system.

Further, the present invention provides an apparatus and method for communicating L2 signaling information using a L1 signaling area or each PLP in a digital broadcast system.

Technical Solution

According to an embodiment of the present invention, an apparatus for transmitting signaling information in a digital broadcast system includes a frame builder generating a plurality of frames including data to be transmitted, an information inserting unit inserting signaling information of a second layer into a packet of a first layer or a signaling area of a first layer of each of the plurality of frames, and a transmitter transmitting the plurality of frames having the signaling information of the second layer inserted therein.

According to an embodiment of the present invention, a method for transmitting signaling information in a digital broadcast system includes generating a plurality of frames including data to be transmitted, inserting signaling information of a second layer into a packet of a first layer or a signaling area of a first layer of each of the plurality of frames, and transmitting the plurality of frames having the signaling information of the second layer inserted therein.

According to an embodiment of the present invention, an apparatus for receiving signaling information in a digital broadcast system includes a receiver receiving a plurality of frames including signaling information of a second layer in a signaling area of a first layer or a packet of the first layer and a signal processor identifying the signaling information of the second layer from the packet of the first layer or the signaling information of the first layer and receiving service data using one of the identified signaling information of the second layer and pre-stored signaling information of the second layer.

According to an embodiment of the present invention, a method for receiving signaling information in a digital broadcast system includes receiving a plurality of frames including signaling information of a second layer in a signaling area of a first layer or a packet of the first layer and identifying the signaling information of the second layer from the packet of the first layer or the signaling information of the first layer and receiving service data using one of the identified signaling information of the second layer and pre-stored signaling information of the second layer.

BRIEF DESCRIPTION OF THE DRAWINGS

FIG. 5 is a view illustrating fields included in configurable L1 post signaling included in L1 post signaling according to an embodiment of the present invention;

FIGS. 6a to 6b are views illustrating a configuration of L2TUN information according to an embodiment of the present invention;

MODE FOR CARRYING OUT THE INVENTION

Hereinafter, various embodiments of the present invention are described in detail with reference to the accompanying drawings. When determined to make the subject matter of the present invention unclear, the detailed description of the known art or functions may be skipped. The terms as used herein are defined considering the functions in the present invention and may be replaced with other terms according to the intention or practice of the user or operator. Therefore, the terms should be defined based on the overall disclosure.

The gist of the present invention is to communicate L2 signaling information using a L1 signaling area or L1 packet in a digital broadcast system.

For such purposes, apparatuses and methods for communicating signaling information in a digital broadcast system are described in detail according to embodiments of the present invention.

Figure 1:
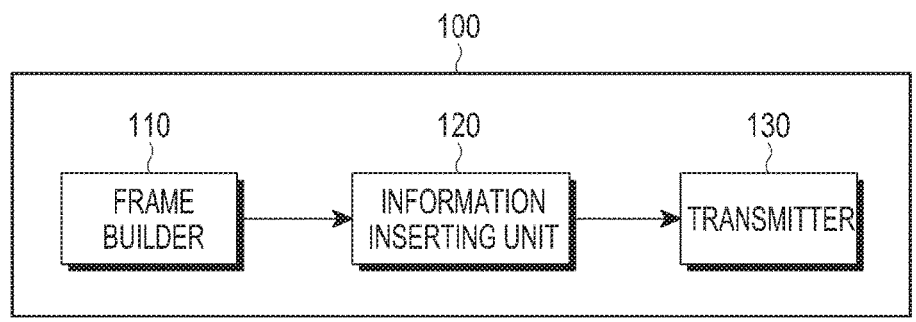
FIG. 1 is a block diagram illustrating a configuration of a transmitting device according to an embodiment of the present invention.

FIG. 1 is a block diagram illustrating a configuration of a transmitting device according to an embodiment of the present invention.

Referring to FIG. 1, the transmitting device 100 includes a frame builder 110, an information inserting unit 120, and a transmitter 130.

The frame builder 110 generates a plurality of frames including data to be transmitted. In an embodiment, the DVB-T2 system adopts the PLP concept allowing for provision of various broadcast services having different modulation schemes, channel coding rates, times and cell interleaving lengths in one broadcast channel.

Here, PLP means a signal path independently processed. That is, each service (e.g., video, expanded video, audio, or data stream) may be communicated through multiple RF channels, and the PLP is a path through which such service is transmitted or a stream transmitted through such path. Further, the PLP may be positioned in slots distributed at temporal intervals over multiple RF channels or may be distributed at temporal intervals on a single RF channel. That is, one PLP may be distributed and transmitted at temporal intervals on one RF channel or multiple RF channels.

The PLP structure includes an input mode A providing one PLP and an input mode B providing multiple PLPs. In particular, supporting the input mode B may provide a particular robust service and subject one stream to distributive transmission to thereby increase the time interleaving length, allowing a time diversity gain to be obtained. Further, in case only a particular stream is received, the receiver is powered off during the remaining time, allowing for low-power use. Thus, it is proper for providing portable and mobile broadcast services.

Here, the time diversity is a technique in which if the transmit side transmits the same signal several times at predetermined time intervals to reduce a deterioration of the transmission quality in a mobile communication transmission path, the receive side resynthesizes such received signals to obtain good transmission quality.

Further, information that may be commonly transmitted to a plurality of PLPs may be included in one PLP and the PLP is transmitted, thereby leading to increased transmission efficiency. The PLP playing such role is PLP0 which is called a common PLP. The other PLPs than PLP0 may be used for transmitting data, and such PLPs are called data PLPs.

Use of such PLP may allow for provision of SDTV programs while carried or on the move as well as the reception of home HDTV programs. Further, differentiated services may be provided allowing for reception of broadcast even in blind spots as well as various services are provided to the user through the broadcast station or broadcast content provider.

That is, the frame builder 110 may generate a frame by mapping the to-be-transmitted data to each of at least one signal processing path and performs signal processing on each path. For example, signal processing may include at least one process of input stream synchronization, delay compensation, null packet deletion, CRC encoding, header insertion, coding, interleaving, and modulation. The frames signal-processed per path, together with the signaling information, are generated as one transmission frame, and the generated transmission frame is transmitted to a receiving device (not shown).

The information inserting unit 120 inserts signaling information into the signaling area or packet of each of the plurality frames.

Here, the signaling information may be a Layer 1 (L1) signaling signal transmitting a L1 signal for frame sync and may include configurable post signaling and dynamic post signaling. The signaling area may be P2 symbol for frame sync. As the signaling area is added to the head of frame, a transmission signal may be generated. In one embodiment, in the DVB-T2 system, one unit of the transmission frame having the P1 symbol and signaling area added to the frame is referred to as a T2 frame.

That is, the P2 symbol may break down into pre signaling and post signaling. Further, the post signaling area may include configurable post signaling and dynamic post signaling.

Here, L1 signaling, configurable post signaling, dynamic post signaling, pre signaling, and post signaling are defined to include, in concept, L1 signaling information, configurable post signaling information, dynamic post signaling information, pre signaling information, and post signaling information.

The P1 symbol and the P2 symbol are terms according to the example of DVB-T2, and the P1 symbol is a symbol indicating the start of a frame, and the P2 symbol may be appreciated as a symbol including the signaling area. In another embodiment, the start of a frame may be known using one preamble symbol including the signaling area.

Meanwhile, according to an embodiment of the present invention, the signaling information inserted into the signaling area includes information necessary to extract the L1 packet constituting each of one or more PLPs assigned to the plurality of frames. Further, the signaling information may further include the table indicator and version information of the L2 signaling table transmitted through the PLP. Further, the signaling information may further include information indicating the significance of the L2 signaling table transmitted through the PLP.

Figure 2:
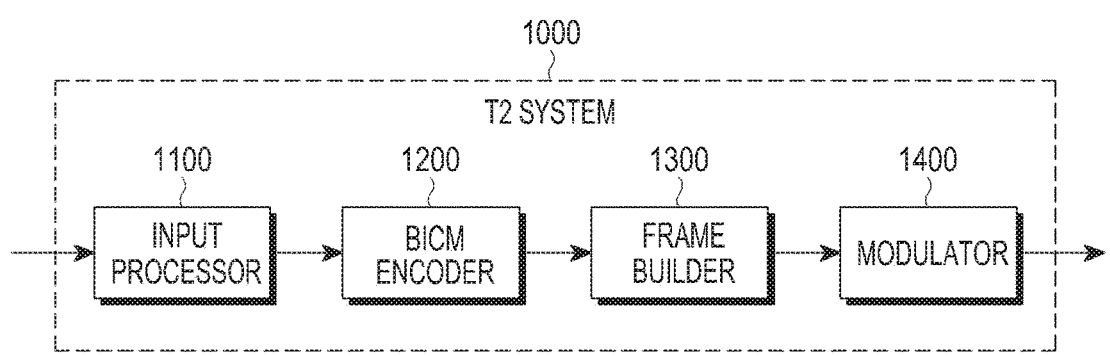
FIG. 2 is a block diagram illustrating a configuration of DVB-T2 according to an embodiment of the present invention.

FIG. 2 is a block diagram illustrating a configuration of DVB-T2 according to an embodiment of the present invention.

Referring to FIG. 2, the DVB-T2 transmission system 1000 may include an input processor 1100, a bit interleaved coding & modulation (BICM) encoder 1200, a frame builder 1300, and a modulator 1400.

The DVB-T2 transmission system 1000 is the same as what is defined in DVB-T2, one European digital broadcast standard, and in this sense, each component is briefly described. Details are disclosed in "Digital Video Broadcasting (DVB), Frame structure channel coding and modulation for a second generation digital terrestrial television broadcasting system (DVB-T2)."

The input processor 1100 generates a baseband (BB) frame from an input stream for data to be served. Here, the input stream may be MPEG-2 transport stream (TS) and generic stream (GS).

The BICM encoder 1200 determines the FEC coding rate and constellation order according to the area (fixed PHY frame or mobile PHY frame) where served data is to be transmitted and performs coding. The signaling information on the served data may be coded through a separate BICM encoder (not shown) or coded by sharing the BICM encoder 1200 with the served data depending on implementations.

The frame builder 1300 determines an OFDM parameter for signaling area and an OFDM parameter for the area where the served data is transmitted to configure a frame and adds a sync area to generate a frame. The modulator 1400 performs modulation to modulate the generated frame into a RF signal and transmits the RF signal to the receiving device.

Figure 3:
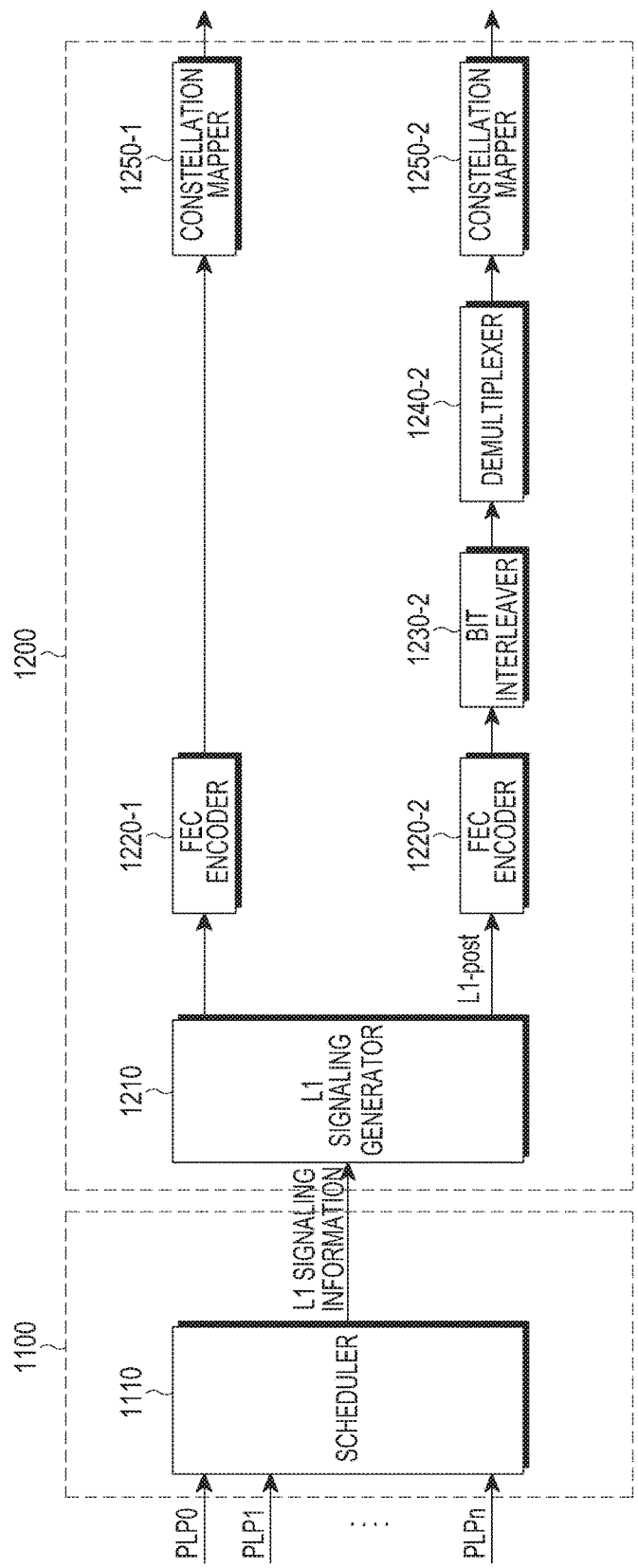
FIG. 3 is a block diagram illustrating the detailed configuration of an input processor 1100 and a BICM encoder 1200 performing frame generation according to an embodiment of the present invention.

Meanwhile, the generation of frame described in connection with FIG. 1 may be performed by the input processor 1100 and the BICM encoder 1200, and information insertion may be performed by the frame builder 1300. Referring to FIG. 3, a detailed configuration of the input processor 1100 and the BICM encoder 1200 is described.

FIG. 3 is a block diagram illustrating the detailed configuration of an input processor 1100 and a BICM encoder 1200 performing frame generation according to an embodiment of the present invention.

Referring to FIG. 3, the input processor 1100 and the BICM encoder 1200 generate a frame according to an embodiment of the present invention. To that end, the input processor 1100 includes a scheduler 1110. The BICM encoder 1200 may include a L1 signaling generator 1210, FEC encoders 1220-1 and 1220-2, a bit interleaver 1230-2, a demultiplexer (Demux) 1240-2, and constellation mappers 1250-1 and 1250-2. The BICM encoder 1200 may further include a time interleaver (not shown). The L1 signaling generator may also be included in the input processor 1100.

n service data, respectively, are mapped to PLP0 to PLPn and are inputted to the scheduler 1110. The scheduler 1110 determines the location, modulation, and code rate for each PLP to map several PLPs to the T2 physical layer. That is, the scheduler 1110 generates L1 signaling. In some cases, the scheduler 1110 may output the dynamic information of the L1 post signaling of the current frame through the frame builder 1300. Further, the scheduler 1110 may transmit the L1 signaling to the BICM encoder 1200. The L1 signaling includes L1 pre signaling and L1 post signaling.

The L1 signaling generator 1210 outputs the L1 pre signaling and L1 post signaling distinctively. The FEC encoders 1220-1 and 1220-2 perform FEC encoding including shortening and puncturing on each of the L1 pre signaling and the L1 post signaling. The bit interleaver 1230-2 performs interleaving on the encoded L1 post signaling in bit units. The demux 1240-2 adjusts the order of bits constituting the cell to control the robustness of bits and outputs the cell including the bits. The two constellation mappers 1250-1 and 1250-2 respectively map the cells of the L1 pre signaling and the L1 post signaling to the constellation map.

The L1 pre signaling and L1 post signaling processed through such frame generation process are output to the frame builder 1230. Accordingly, the L1 pre signaling and the L1 post signaling may be inserted into the frame.

Figure 4A:
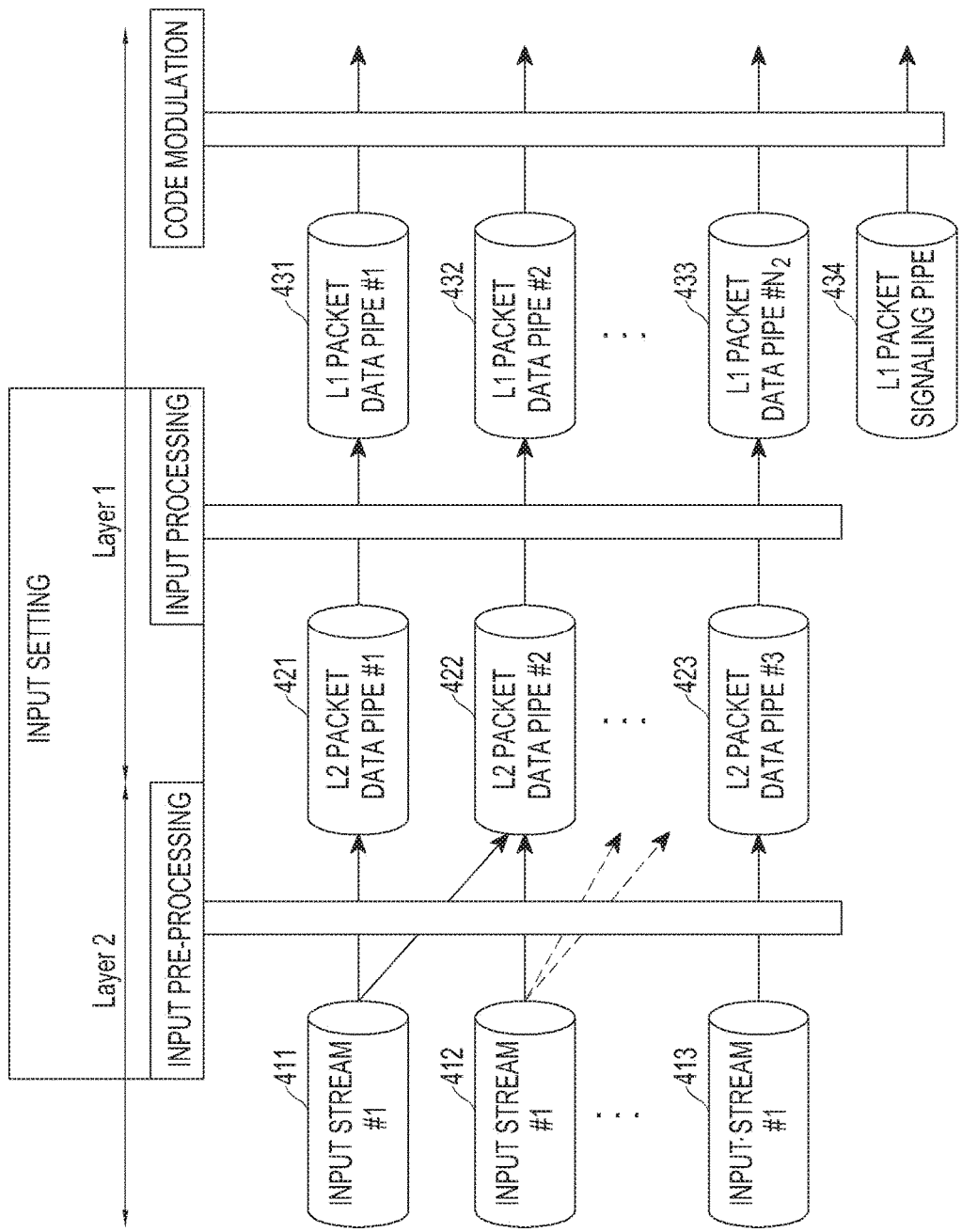
FIGS. 4a to 4c are views illustrating the structure of unit of a transmission frame according to an embodiment of the present invention.
Figure 4B:
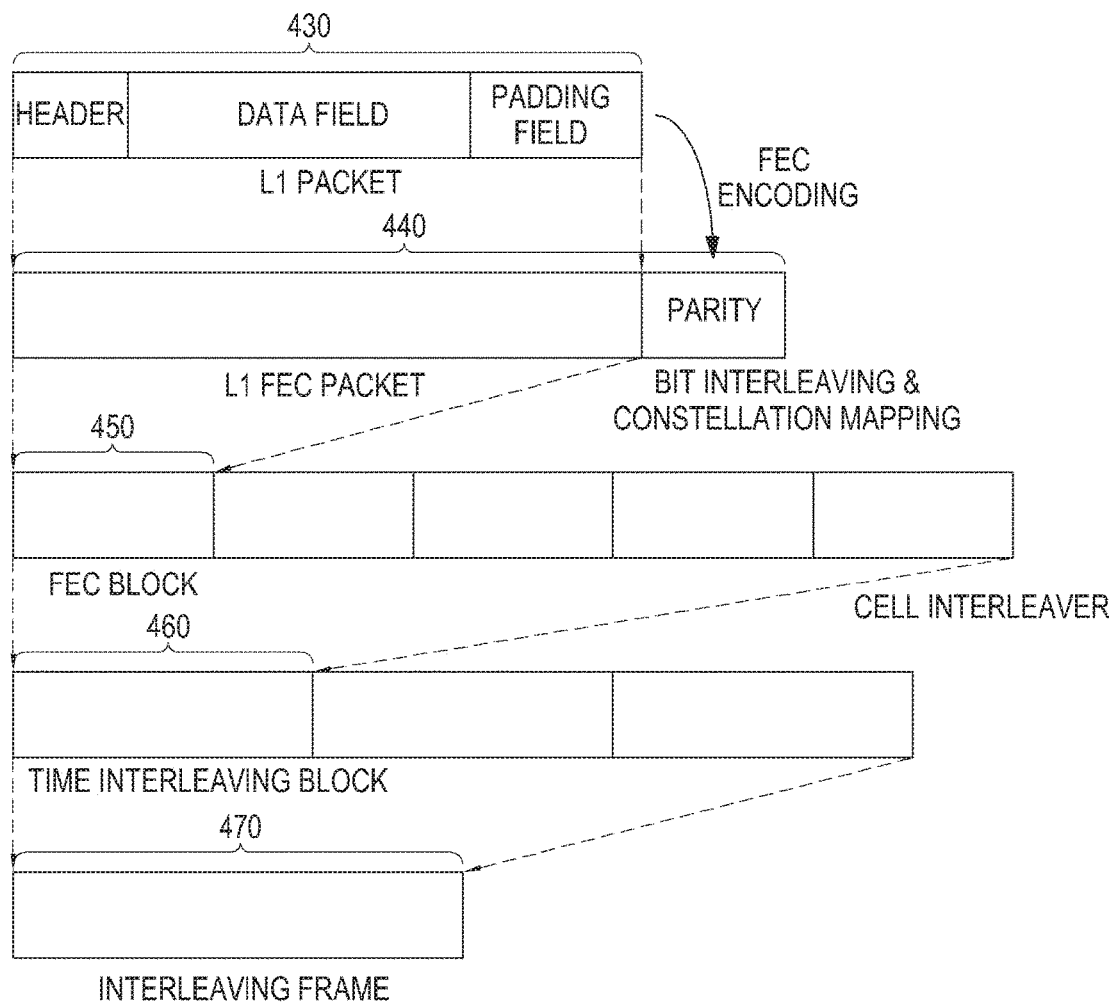
Figure 4C:
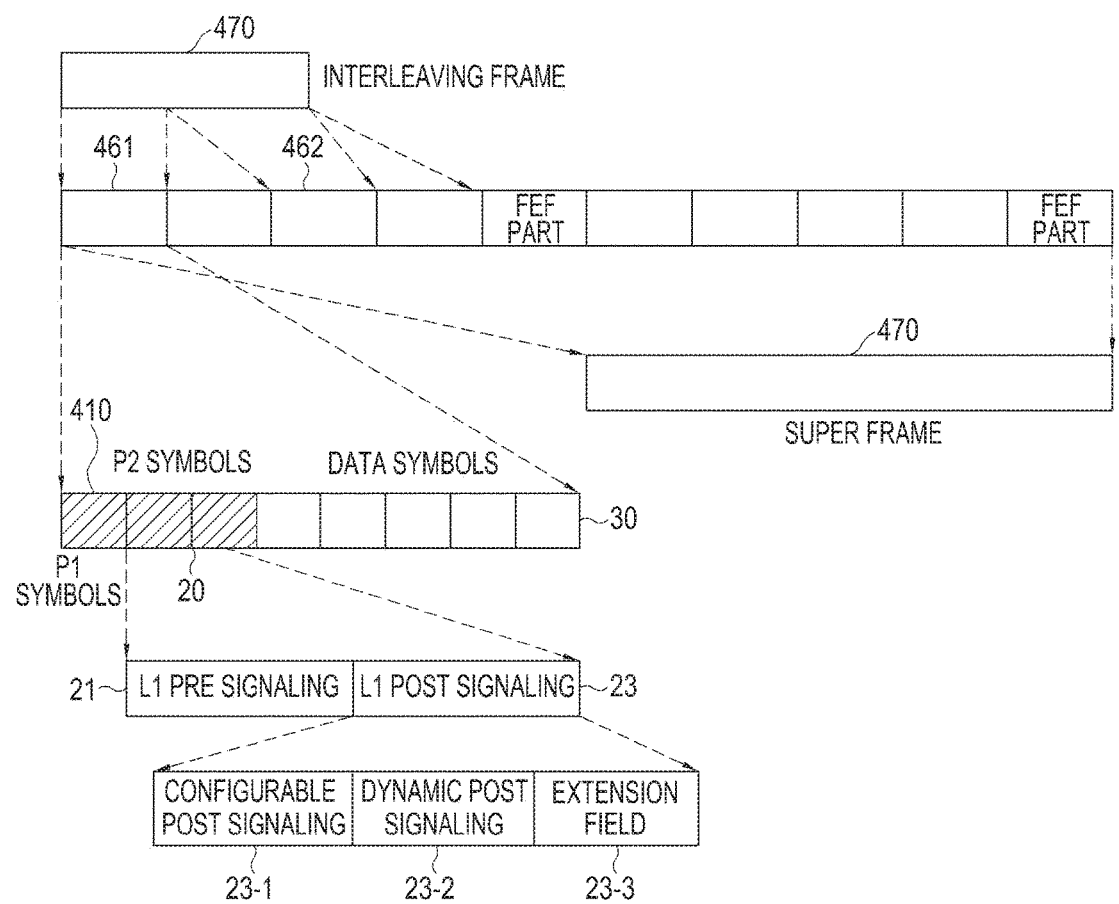

FIGS. 4a to 4c are views illustrating the structure of unit of a transmission frame according to an embodiment of the present invention.

As shown in FIG. 4a, the input processing module by which the input stream is processed as L1 packet may be operated at a data pipe level.

FIG. 4a shows a process in which the input stream is processed as L1 packet. A plurality of input streams 411 to 413 are processed as the data pipes 421 to 423 for a plurality of L2 packets through the input pre-processing process, and the data pipes 421 to 423 for the plurality of L2 packets are encapsulated to the data pipes 431 to 433 for the plurality of L1 packets through the input processing process. Accordingly, the data pipes 431 to 433 for the plurality of L1 packets are scheduled as transmission frames by the scheduler 1110. Here, the L2 packet comes in two types, including fixed stream such as transport stream (TS) and variable stream such as general stream encapsulation (GSE). In the input pre-processing process shown in FIG. 4a, the version information of the L2 signaling table is updated per PLP and may be transferred to the L1 signaling generator 1210.

FIG. 4b shows the structure of a local frame for each PLP.

As shown in FIG. 4b, the L1 packet 430 includes a header, data fields and padding field.

The L1 packet 430 adds a parity 432 through the FEC encoding process and is processed as the L1 FEC packet 440.

The L1 FEC packet 440 is processed as the FEC block 450 through the bit interleaving and constellation mapping process, and a plurality of FEC blocks are processed as time interleaving block 460 through the cell interleaving process, and the plurality of interleaving blocks constitute the interleaving frame 470.

FIG. 4c shows the structure of an interleaving frame.

Referring to FIG. 4c, the interleaving frame 470 may be transmitted through different transmission frames 461 and 462, and the plurality of transmission frames may form one super frame 470.

Meanwhile, one transmission frame 461 may consist of a P1 symbol indicating the start position of the frame, a P2 symbol 20 transmitting the L1 signal, and data symbols 30 transmitting data.

The P1 symbol 10 is positioned at the head of the transmission frame 461 and may be used to detect the start point of the T2 frame. For example, the P1 symbol 10 may transmit seven-bit information.

The P2 symbol 20 is positioned next to the P1 symbol 10 in the T2 frame. One transmission frame 461 may include a plurality of P2 symbols 20 depending on the FFT size. The number of P2 symbols 20 included as per the FET size is shown in Table 1.

TABLE 1

| FET size | Number of P2 symbols |
|---|---|
| 1K | 16 |
| 2K | 8 |
| 4K | 4 |
| 8K | 2 |
| 16K | 1 |
| 32K | 1 |

The P2 symbol 20 includes L1 pre signaling 21 and L1 post signaling 23. The L1 pre signaling 21 provides basic transmission parameters including parameters required to receive and decode the L1 post signaling.

The L1 post signaling 23 includes configurable post signaling 23-1 and dynamic post signaling 23-2. Further, the L1 post signaling 23 may selectively include an extension field 23-3. Further, although not shown in the drawings, the L1 post signaling 23 may further include a CRC field, and as necessary, L1 padding field.

FIG. 5 shows the fields included in the configurable L1 post signaling included in the L1 post signaling according to an embodiment of the present invention. NUM_PLP denotes the number of PLPs included in the current super frame and this may be constituted of eight bits and may be included in the configurable L1 post signaling.

PLP_ID is an ID for identifying PLP, and PLP_L2TUN_MODE (L2 signaling table update notification mode) next to PLP_ID indicates whether the PLP identified by PLP_ID provides information on the L2 signaling table update. The information transferred at PLP_L2TUN_MODE is hereinafter referred to as L2 signaling table change notification (L2TUN) information.

According to an embodiment of the present invention, PLP_L2TUN_MODE may consist of two bits as shown in FIG. 5 and may have the value shown in the following Table 2.

TABLE 2

| Value | Description |
|---|---|
| 00 | L2TUN information on corresponding PLP is not transferred. |
| 01 | L2TUN information on corresponding PLP is included and transmitted in dynamic L1 post signaling |
| 10 | L2TUN information is included and transmitted in the header of each L1 packet of corresponding PLP |
| 11 | Reserved for future use |

According to another embodiment of the present invention, in case PLP_L2TUN_MODE="10," the L2TUN information on the corresponding PLP may be included and transmitted in the first L1 packet of the current frame or the header of the L1 packet at a particular position.

According to another embodiment of the present invention, in case one bit is assigned to PLP_L2TUN_MODE, and PLP_L2TUN_MODE="0," the L2TUN information on the corresponding PLP is not transferred, and in case PLP_L2TUN_MODE="1," the L2TUN information at a preset position may be transmitted. The preset position may be the header of the L1 packet or the dynamic L1 post signaling area.

In the above embodiments, although the L2TUN information may be included and transmitted in the header of the L1 packet, in case a space for signaling is defined in the payload of a particular L1 packet, the L2TUN information may be apparently included in the space for signaling.

FIGS. 6a to 6b are views illustrating a configuration of L2TUN information according to an embodiment of the present invention.

FIG. 6a shows an example in which the L2TUN information is included and transmitted in the header or payload of the L1 packet. In FIG. 6a, each field may have the following meaning.

PLP_ID, identifier of the PLP where the L2TUN information of FIG. 6a applies

NUM_TABLES, number of L2 signaling tables including the update information in the L2TUN information of FIG. 6a TABLE_ID, identifier of L2 signaling table TABLE_ID_EXTENTION, identifier of extended L2 signaling table VERSION_NUMBER, version information of L2 signaling table identified by TABLE_ID and TABLE_ID_EXTENTION. In case the content of the L2 signaling table is varied, SIGNIFICANCE_FLAG increased at the increment of (1 modulo 32), and denotes the degree of need for updating the L2 signaling table identified by TABLE_ID and TABLE_ID_EXTENTION and has the value shown in the following Table 3.

TABLE 3

| Value | Description |
|---|---|
| 000 | For a service to be played, update of the table should precede. |
| 001 | Although service may be played before the table is updated, update is required later. |
| 010 | The content of the table is not related to playing service |
| 011~111 | Reserved for future use |

As an example of the L2 signaling table that may be set as SIGNIFICANCE_FLAG="000," a table including the information on the stream identifier allowing for access to the video or audio stream or information on sync is among the L2 signaling tables. As an example of the L2 signaling table that may be set as SIGNIFICANCE_FLAG="001," a table including the information provided to the user although not related to the play of media, such as the name of service, is among the L2 signaling tables. As an example of the L2 signaling table that may be set as SIGNIFICANCE_FLAG="010," a table including the information on the IP port through which emergency broadcast is transmitted is among the L2 signaling tables.

FIG. 6b shows another example in which the L2TUN information is included and transmitted in the header or payload of the L1 packet. While the L2TUN information shown in FIG. 6a includes only update information of the L2 signaling transmitted through one PLP, the L2TUN information shown in FIG. 6b may include the undate information on the L2 signaling table transmitted through a plurality of PLPs.

It is apparent that some fields may be omitted from the L2TUN information shown in FIGS. 6a and 6b depending on system operation schemes. As an example, in case the number and type of L2 signaling tables included in the L2TUN information, the NUM_TABLES, TABLE_ID, TABLE_ID_EXTENSION fields may be omitted, and upon intending to transfer only information on the table (the L2 signaling table corresponding to SIGNIFICANCE_FLAG="000") required to be updated for playing the service for the purpose of reducing signaling overhead, the SIGNIFICANCE_FLAG field may be omitted.

Figures 7, 8:
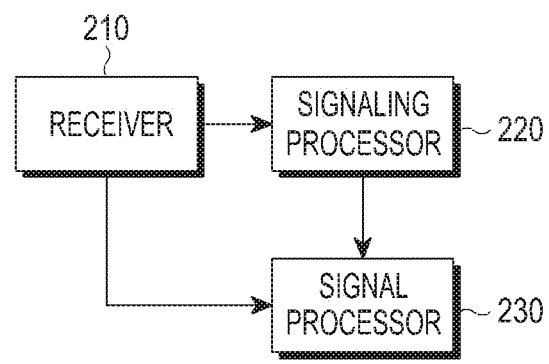
FIG. 7 is a view illustrating fields included in dynamic L1 post signaling included in L1 post signaling according to an embodiment of the present invention.
FIG. 8 is a block diagram illustrating a configuration of a receiving device according to an embodiment of the present invention.

FIG. 7 is a view illustrating fields included in dynamic L1 post signaling included in L1 post signaling according to an embodiment of the present invention.

It is apparent that some fields may be omitted from the L2TUN information shown in FIG. 7 depending on system operation schemes. As an example, in case the number and type of L2 signaling tables included in the L2TUN information are limited, the NUM_TABLES, TABLE_ID, and TABLE_ID_EXTENSION fields may be omitted, and information on the omitted fields may be configured and transferred in a separate L2 signaling table. Further, upon intending to transfer only information on the table (L2 signaling table corresponding to SIGNIFICANCE_FLAG="000") required to be updated for playing the service for the purpose of reducing signaling overhead, the SIGNIFICANCE_FLAG field may be omitted.

FIG. 8 is a block diagram illustrating a configuration of a receiving device according to an embodiment of the present invention.

Referring to FIG. 8, the receiving device 200 includes a receiver 210, a signaling processor 220, and a signal processor 230.

The receiver 210 receives a RF signal mapped with a plurality of frames including signaling information and data. Here, the signaling information includes information necessary for extracting the L1 packet constituting one or more PLPs assigned to the plurality of frames. The signaling information may further include the table indicator and version information of the L2 signaling table transmitted through the PLP. Further, the signaling information may further include information indicating the significance of the L2 signaling table transmitted through the PLP.

According to an embodiment of the present invention, in case the sync area is separated from the signaling area, the receiver 210 performs demodulation according to the OFDM parameter from the received RF signal, performs sync detection, and if the sync is detected, recognizes whether the frame currently received is a frame including necessary service data from the signaling information stored in the sync area. For example, the receiver 210 may recognize whether a mobile frame is received or fixed frame is received.

At this time, in case the OFDM parameter for the signaling area and data area is not previously determined, the receiver 210 may obtain the OFDM parameter for the signaling area and data area stored in the sync area to obtain the OFDM parameter information for the signaling area and data area coming right after the sync area and perform demodulation.

According to another embodiment of the present invention, in case the sync area is not separated from the signaling area, the receiver 210 performs demodulation according to the OFDM parameter from the received RF signal, performs sync detection, and transfers the demodulated OFDM cells to the signaling processor 220. The signaling processor 220 processes the demodulated OFDM cells to recognize whether the frame currently received is a frame including necessary service data. For example, the receiver 210 may recognize whether a mobile frame is received or fixed frame is received.

The signaling processor 220 may extract signaling information from the received frame. In particular, the signaling processor 220 may extract the L1 signaling information and analyze the extracted L1 signaling information to obtain the information necessary to extract the L1 packet constituting each of one or more PLPs assigned to the plurality of frames. To that end, the signaling processor 220 may detect the P1 symbol and the P2 symbol and perform demodulation, then extract the data block including the L1 signaling information and perform decoding. According to another embodiment of the present invention, the signaling processor 220 may detect the preamble symbol and perform demodulation, then extract the data block including the L1 signaling information and perform decoding.

The signal processor 230 may signal-process the data included in the frame based on the extracted L1 signaling information.

The signal processor 230 may signal-process the received frame using the value regarding the information on the data inserting method and information regarding the type of frame, and information regarding the protocol version of the frame obtained by the signaling processor 220. For example, the signal processing may perform demodulation, frame debuilder, BICM decoding, and input de-processing process.

In particular, the signal processor 230 may extract the PLP, perform FEC decoding, and generate the L2 packet from the error-corrected L1 packet based on the value regarding the information on the data inserting method and information regarding the type of frame, and information regarding the protocol version of the frame provided from the signaling processor 220.

Figure 9:
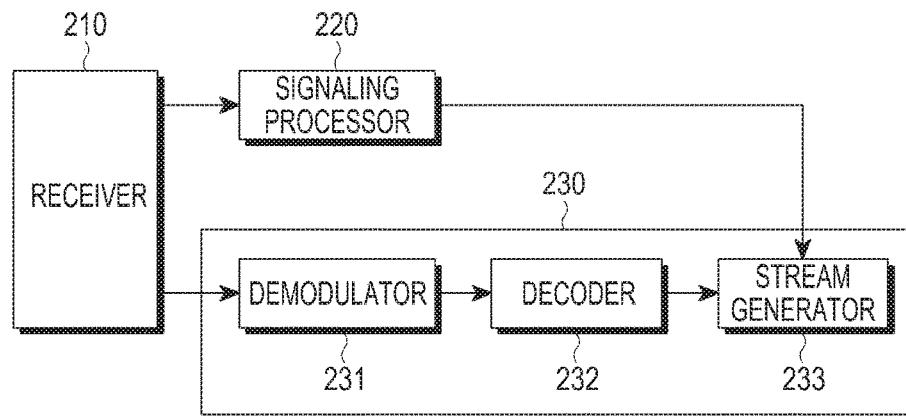
FIG. 9 is a block diagram illustrating a detailed configuration of a signal processor 230 of a receiving device according to an embodiment of the present invention.

FIG. 9 is a block diagram illustrating a detailed configuration of a signal processor 230 of a receiving device according to an embodiment of the present invention.

Referring to FIG. 9, the signal processor 230 includes a demodulator 231, a decoder 232, and a stream generator 233.

The demodulator 231 demodulates the received signal, generates a value corresponding to each LDPC codeword and outputs the same to the decoder 232. In this case, the demodulator 231 may obtain the parameter, such as the modulation scheme for the data stored in each data area using signaling information to perform decoding. Further, the demodulator 231 may produce the position of the necessary data based on data information included in the configurable field and the dynamic field. That is, it may present the position in the frame where the necessary PLP is transmitted.

The decoder 232 performs decoding on the inputted data. In this case, the decoder 232 may obtain the parameter, such as the FEC scheme or the modulation scheme for the data stored in each data area using signaling information to perform decoding. Further, the decoder 223 may produce the start position of the data based on the data information included in the configurable post signaling and dynamic post signaling. That is, the decoder 223 may present the position in the frame where the PLP is transmitted.

The stream generator 233 may process the L1 packet received from the decoder 232 to generate data to be served.

The stream generator 233 may generate the L2 packet from the error-corrected L1 packet based on the value regarding the information on the data inserting method and information regarding the type of frame, and information regarding the protocol version of the frame provided from the signaling processor 220.

Specifically, the stream generator 233 may include de-jitter buffers. The de jitter buffers may regenerate the exact timing for restoring output streams based on the value regarding the information on the data inserting scheme and the information regarding the type of frame and information regarding the protocol version of the frame provided from the signaling processor 220. Accordingly, delay for syncing the plurality of PLPs may be compensated.

Figure 10:
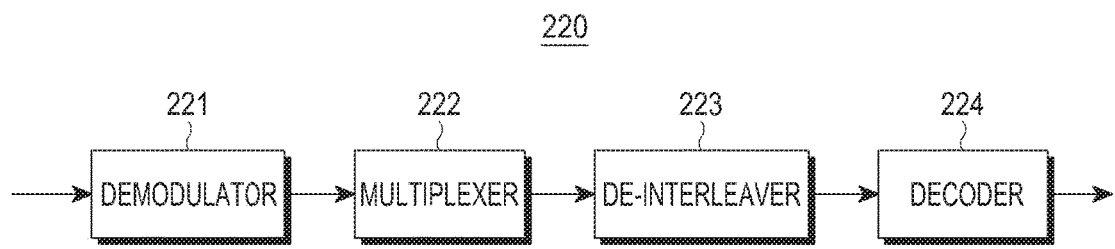
FIG. 10 is a block diagram illustrating a detailed configuration of a signaling processor 220 of a receiving device according to an embodiment of the present invention.

FIG. 10 is a block diagram illustrating a detailed configuration of a signaling processor 220 of a receiving device according to an embodiment of the present invention.

Referring to FIG. 10, the signaling processor 220 includes a demodulator 221, a multiplexer 222, a de-interleaver 223, and a decoder 224.

The demodulator 221 receives and demodulates signals transmitted from the transmitting device 100. Specifically, the demodulator 221 demodulates the received signal, generates a value corresponding to the LDPC codeword and outputs the same to the multiplexer 222.

The value corresponding to the LDPC codeword may be represented as a channel value for the received signal. Here, there may be various methods for determining the channel value, and as an example, a method for determining the log likelihood ratio (LLR) value may be among such methods.

The LLR value may be represented as a value obtained by taking the logarithm of the ratio of the probability that the bit transmitted from the transmitting device 100 is 0 to the probability that the bit is 1. Or, the LLR value may be the bit value itself determined by hard decision or may be a representative value determined according to the interval where the probability that the bit transmitted from the transmitting device 100 is 0 or 1.

The multiplexer 222 multiplexes the value outputted from the demodulator 221 and outputs the same to the de-interleaver 223. The value outputted from the demodulator 221 is a value corresponding to the LDPC codeword and may be, e.g., the LLR value.

Specifically, the multiplexer 222 is a component corresponding to the demux 1240-2 included in the transmitting device 100 of FIG. 3 and may perform a reverse operation of the operation performed by the demux 1240-2. That is, the multiplexer 222 may parallel-to-serial convert the value corresponding to the LDPC codeword outputted from the demodulator 221 and multiplexes the value corresponding to the LDPC codeword.

The de-interleaver 223 deinterleaves the value outputted from the demux 222 and outputs the same to the decoder 224.

Specifically, the de-interleaver 223 is a component corresponding to the interleaver 1230-2 provided in the transmitting device 100 of FIG. 3 and may perform a reverse operation of the operation performed by the interleaver 1230-2. That is, the de-interleaver 223 may perform deinterleaving on the value corresponding to the LDPC codeword to correspond to the interleaving operation performed by the interleaver 1230-2. An example of the value corresponding to the LDPC codeword may be the LLR value.

The decoder 224 is a component corresponding to the FEC encoder 1220-2 provided in the transmitting device 100 and may perform a reverse operation of the operation performed by the FEC encoder 1220-2. Specifically, the decoder 224 may perform decoding based on the deinterleaved LLR value and output the L1 signaling.

Meanwhile, the plurality of frames received by the receiver 210 may be received from the transmitting device 100, and here, the transmitting device 100 may be a DVB-T2 transmission system.

Further, the signaling area of the frame may be an area assigned to the L1 signaling.

Figure 11:
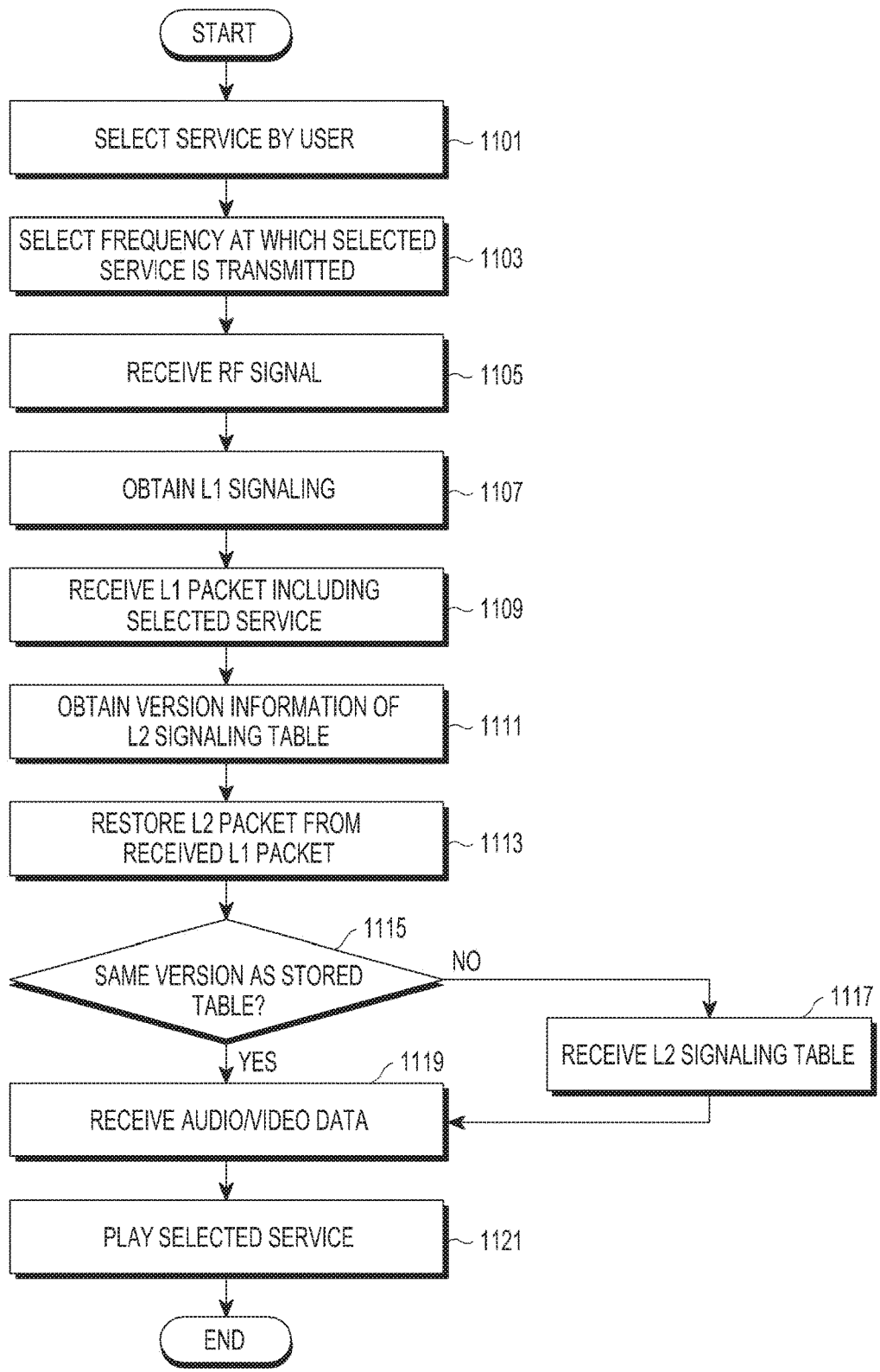
FIG. 11 is a flowchart illustrating a method for receiving signaling information by a receiving device according to an embodiment of the present invention.

FIG. 11 is a flowchart illustrating a method for receiving signaling information by a receiving device according to an embodiment of the present invention. That is, FIG. 11 shows the process after the user selects a new service and until the selected service is played.

In the following description, it is assumed that the information indicating the mapping information between the PLP and broadcast frequency and the service, the L2 signaling table for each service, and the version information of the L2 signaling table have been obtained in the process of initializing the receiving device or in the signal receiving process before the user selects the current service. Further, it is assumed for ease of description that all the L2 signaling tables are signaling tables inevitable for playing the service.

Referring to FIG. 11, the receiving device receives selection of a service from the user (1101). The receiving device selects (1103) a particular frequency at which the selected service is transmitted using the mapping information between the selected service and the broadcast frequency and receives the RF signal (1105). Thereafter, the receiving device obtains (1107) L1 signaling information included in the transmission frame from the received RF signal and receives (1109) L1 packet from the received RF signal using the L1 signaling information.

At this time, the version information and identifier of the L2 signaling table necessary to initiate to play the selected service are included in the L1 signaling or L1 packet. Accordingly, the receiving device obtains the version information and identifier of the L2 signaling table necessary to initiate to play the selected service from the L1 signaling or L1 packet (1111). At this time, the receiving device may additionally obtain the information indicating the significance of the L2 signaling table from the L1 signaling or L1 packet.

The receiving device restores the L2 packet from the received L1 packet (1113). The receiving device identifies whether the obtained identifier and version information of the L2 signaling are consistent with the pre-stored identifier and version information of the L2 signaling table (1115). In case the obtained identifier and version information of the L2 signaling table are consistent with the pre-stored identifier and version information of the L2 signaling table, the receiving device receives (1119) audio and video data using the stored L2 signaling information and plays the service corresponding to the received data (1121).

By contrast, unless the obtained identifier and version information of the L2 signaling are consistent with the pre-stored identifier and version information of the L2 signaling table, the receiving device receives a new version of L2 signaling table (1117). The receiving device receives (1119) audio and video data using the new version of L2 signaling data and plays the service corresponding to the received data (1121).

Additionally, in the process 1111 of obtaining the identifier and version information of the L2 signaling table included in the current frame, information indicating the significance of the L2 signaling table may be additionally obtained. At this time, the process 1117 of obtaining the new version of L2 signaling table may be omitted for L2 signaling tables that do not require the table update for playing service to precede.

Figure 12:
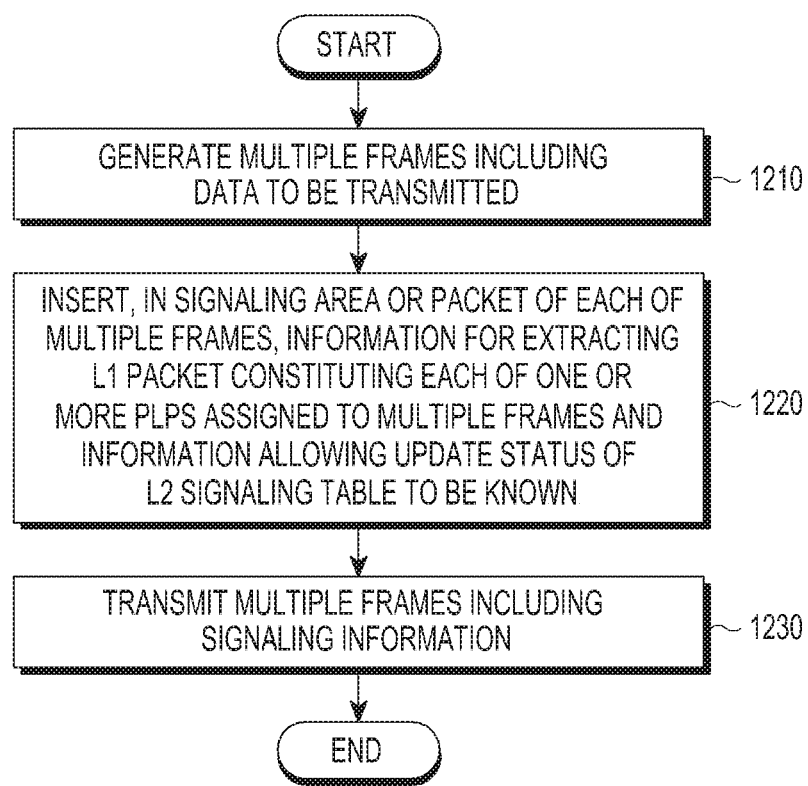
FIG. 12 is a flowchart illustrating a method for transmitting signaling information by a transmitting device according to an embodiment of the present invention.

FIG. 12 is a flowchart illustrating a method for transmitting signaling information by a transmitting device according to an embodiment of the present invention.

Referring to FIG. 12, the transmitting device generates a plurality of frames including data to be transmitted (1210).

The transmitting device inserts L2 signaling information into the L1 signaling area or L1 packet of each of a plurality of frames (1220). Here, the transmitting device inserts, into the L1 signaling area or L1 packet, information for extracting the L1 packet constituting each of one or more PLPs assigned to the plurality of frames and information allowing the update status of the L2 signaling table to be known. The information allowing the update status of the L2 signaling table may include the identifier and version of the L2 signaling table and information indicating the significance in playing service.

The transmitting device transmits a plurality of frames having L2 signaling information inserted therein (1230).

Meanwhile, the transmitting device 100 is implemented as a DVB-T2 transmission system. Further, whether to transmit the information allowing the update status of the L2 signaling table to be known may be transmitted in the L1 signaling area, and actual information may be included and transmitted in the header or payload of the L1 packet.

According to various embodiments of the present invention, as described above, the information allowing the update status of the L2 signaling table to be known may be transferred to the receiving device, allowing the receiving device to shorten the time required to obtain the L2 signaling table while reducing the channel zapping time.

Meanwhile, the method for communicating signaling information according to the present invention may be provided in a non-transitory computer readable medium storing a program sequentially performing the same.

As an example, there may be provided a non-transitory computer readable medium storing a program performing the steps of generating a plurality of frames including data to be transmitted in a digital broadcast system and inserting signaling information into a signaling area of each of the plurality of frames.

As an example, there may also be provided a non-transitory computer readable medium storing a program performing the steps of extracting signaling information from a frame received in a digital broadcast system and signal-processing data included in the frame based on the extracted signaling information.

The non-transitory computer readable medium means a medium readable by a machine and semi-permanently storing data, rather than a medium storing data for a short time, such as registers, cash, and memories. Specifically, the above-described various applications or programs may be stored and provided in a non-transitory computer readable medium, such as a CD, DVD, hard disk, Blu ray disk, USB, memory memory card, and ROM.

Further, although no bus is shown in the above block diagrams of the transmitting device and receiving device, the communication between the components in the transmitting device and receiving device may be performed via a bus. Further, each device may further include a processor, such as a CPU and microprocessor performing the above-described various steps.

Further, although preferred embodiments of the present invention have been shown and described above, the present invention is not limited to the above-described particular embodiments, and various changes may be made thereto by one of ordinary skill in the art without departing from the gist of the present invention claimed in the appended claims, and such changes should not be individually understood from the technical scope or spirit of the present invention.

The invention claimed is:

1. An apparatus for transmitting signaling information in a digital broadcast system, the apparatus comprising:
   a transceiver configured to transmit or receive data; and
   a processor configured to:
      generate a plurality of frames including data to be transmitted, insert signaling information of a data link layer into a packet of a physical layer or a signaling area of a physical layer of each of the plurality of frames, and control to transmit the plurality of frames having the signaling information of the data link layer inserted therein, wherein the signaling information of the data link layer includes a table indicator and version information of a data link layer signaling table, and wherein the signaling information of the data link layer further includes information indicating a significance of the data link layer signaling table.

2. The apparatus of claim 1, wherein the signaling information of the data link layer includes information necessary for extracting the physical packet constituting each of one or more physical layer pipes (PLPs) assigned to the plurality of frames.

3. The apparatus of claim 2, wherein the packet of the physical layer includes a table indicator and version information of a data link layer signaling table transmitted through the PLP in a header or payload, and wherein the packet of the physical layer further includes information indicating a significance of the data link layer signaling table transmitted through the PLP in the header or payload of the packet of the physical layer.

4. A method for transmitting signaling information in a digital broadcast system, the method comprising:

generating a plurality of frames including data to be transmitted;

inserting signaling information of a data link layer into a packet of a physical layer or a signaling area of a physical layer of each of the plurality of frames; and transmitting the plurality of frames having the signaling information of the data link layer inserted therein, wherein the signaling information of the data link layer includes a table indicator and version information of a data link layer signaling table, and wherein the signaling information of the data link layer further includes information indicating a significance of the data link layer signaling table.

5. The method of claim 4, wherein the signaling information of the data link layer includes information necessary for extracting the first packet constituting each of one or more physical layer pipes (PLPs) assigned to the plurality of frames.

6. The method of claim 5, wherein the packet of the physical layer includes a table indicator and version information of a data link layer signaling table transmitted through the PLP in a header or payload, and wherein the packet of the physical layer further includes information indicating a significance of the data link layer signaling table transmitted through the PLP in the header or payload of the packet of the physical layer.

* * * * *